United States Patent [19]

Kempter et al.

[11] Patent Number: 4,724,244
[45] Date of Patent: Feb. 9, 1988

[54] COATING AGENTS AND THEIR PREPARATION, AND CATHODIC ELECTROCOATING

[75] Inventors: Fritz E. Kempter, Mannheim; Wolfram Weiss, Mutterstadt; Rolf Osterloh, Gruenstadt; Albrecht Zosel, Weinheim, all of Fed. Rep. of Germany

[73] Assignee: BASF Aktiengesellschaft, Ludwigshafen, Fed. Rep. of Germany

[21] Appl. No.: 42,525

[22] Filed: Apr. 27, 1987

Related U.S. Application Data

[63] Continuation of Ser. No. 744,145, Jun. 13, 1985, abandoned.

[30] Foreign Application Priority Data

Jun. 16, 1984 [DE] Fed. Rep. of Germany ....... 3422509

[51] Int. Cl.⁴ .............................................. C09D 5/44
[52] U.S. Cl. ................... 523/414; 204/181.7; 523/415; 524/502; 524/509; 524/510; 524/512; 525/109; 525/110; 525/513; 525/535; 525/538
[58] Field of Search .................. 523/44, 415; 525/109, 525/110, 513; 524/502, 510, 512, 181.7

[56] References Cited

U.S. PATENT DOCUMENTS

| | | | |
|---|---|---|---|
| 3,619,398 | 11/1971 | Bosso | 204/181 |
| 3,971,708 | 7/1976 | Davis et al. | 204/181 |
| 4,170,579 | 10/1979 | Bosso et al. | 523/415 |
| 4,212,779 | 7/1980 | Schmolzer et al. | 260/22 |
| 4,225,479 | 9/1980 | Hicks | 523/415 |
| 4,291,147 | 9/1981 | Kempter et al. | 528/119 |
| 4,307,208 | 12/1981 | Chattha | 525/513 |
| 4,310,646 | 1/1982 | Kempter | 525/528 |
| 4,350,790 | 9/1982 | Chattha | 525/513 |
| 4,373,059 | 2/1983 | Patzschke et al. | 524/761 |
| 4,373,072 | 2/1983 | Patzschke et al. | 525/438 |
| 4,544,687 | 10/1985 | Schupp et al. | 523/415 |
| 4,560,717 | 12/1985 | Christenson et al. | 523/415 |

FOREIGN PATENT DOCUMENTS

| | | | |
|---|---|---|---|
| 553967 | 3/1958 | Canada | 525/513 |
| 0012463 | 6/1980 | European Pat. Off. | |
| 0025555 | 9/1980 | European Pat. Off. | |
| 0025554 | 9/1980 | European Pat. Off. | |
| 0004090 | 10/1981 | European Pat. Off. | |
| 0040867 | 11/1983 | European Pat. Off. | |
| 2208953 | 6/1974 | France | |
| 1172916 | 12/1969 | United Kingdom | |
| 1413054 | 12/1972 | United Kingdom | |
| 1391922 | 4/1975 | United Kingdom | |
| 1400264 | 7/1975 | United Kingdom | |
| 1411568 | 10/1975 | United Kingdom | |
| 1553036 | 10/1979 | United Kingdom | |

Primary Examiner—Allan M. Lieberman
Attorney, Agent, or Firm—Keil & Weinkauf

[57] ABSTRACT

Cathodic coating agents which are rendered water-dilutable by the addition of an acid, contain binder systems possessing basic nitrogen groups and may or may not contain pigments, dyes, fillers, solvents, antioxidants, other surface coating assistants and/or additional crosslinking components, the binder system containing sulfonate and/or phosphonate groups or the esters of these groups in an amount of from 0.05 to 3% by weight, and the preparation of such products.

The novel coating agents are useful for the cathodic electrocoating of electrically conductive substrates.

11 Claims, 2 Drawing Figures

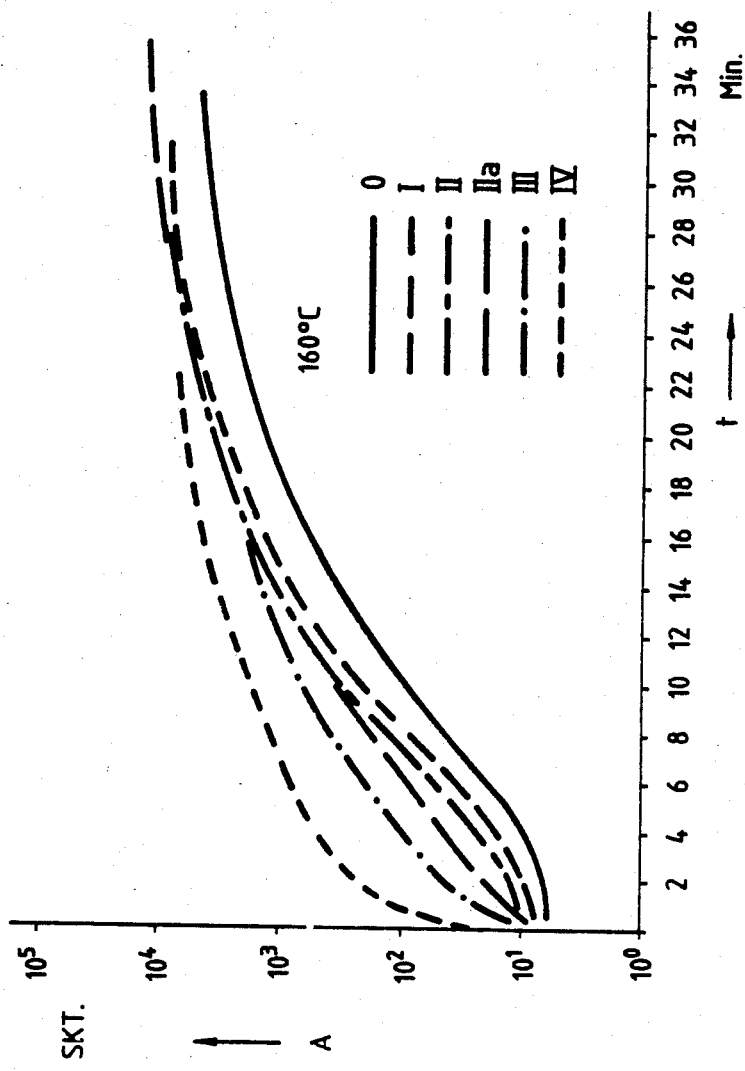

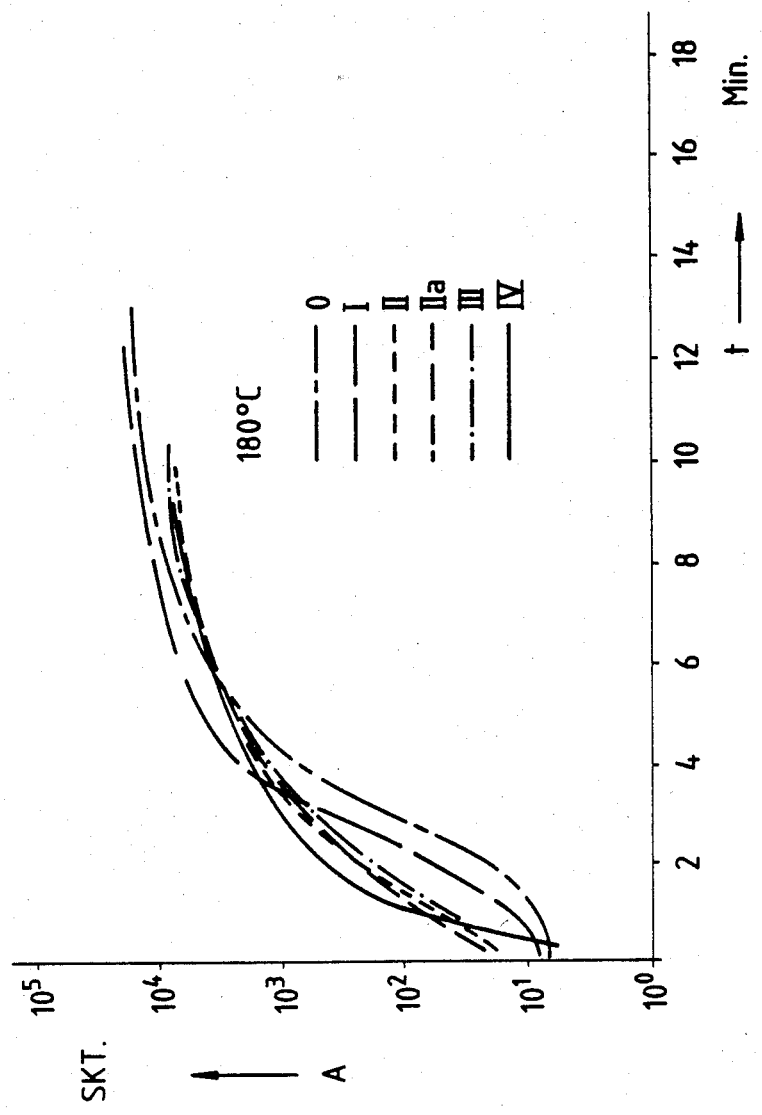

COATING AGENTS AND THEIR PREPARATION, AND CATHODIC ELECTROCOATING

This application is a continuation of application Ser. No. 744,145, filed on June 13, 1985, now abandoned.

The present invention relates to coating agents which contain binder systems which possess basic nitrogen groups, are rendered water-dilutable by the addition of an acid and can be used for the cathodic electrocoating of metal articles, and to the preparation of these binder systems.

A large number of crosslinking processes have been proposed for curing cathodic electrocoating binders. The effectiveness of these crosslinking processes is essentially based on the fact that these curing reactions in the basic medium of the deposited coating agent do not require to be catalyzed by acids.

Binder systems, or coating agents, which are capable of undergoing an acid-catalyzed curing reaction, in particular those which are combined with aminoplasts and phenoplasts as curing agents, have to date not been used as widely as would have been expected from the large number of economically available aminoplast and phenoplast resins.

An important reason for this is the difficulty of achieving sufficiently effective curing or acid-catalyzed curing in the stated basic medium of the deposited coating agent.

A further difficulty arises from the fact that, for technical and, where aminoplast and phenoplast resins are used as curing agents, for chemical reasons, it is necessary to provide coating agents which have a high content of basic groups in order to provide a neutral or, preferably, slightly alkaline bath pH. The fact that, for economic reasons, the desire for lower curing temperatures has frequently been expressed recently is also of importance.

As far back as the early stages of the development of cathodic binders, possibilities and methods for influencing the curing reaction by acid catalysis were investigated and suggested. For example, German Laid-Open Application DOS No. 2,250,042 describes a process for acid catalysis by using p-toluenesulfonic acid to accelerate curing, wherein the amount of catalyst present in the bath for deposition together with the resins is controlled by monitoring a property of the cured coating which is a function of the degree of curing, and the concentration of the curing accelerator in the bath is adjusted so that the properties of the cured film are maintained within a preselected range of test data.

German Laid-Open Application DOS No. 2,360,098 envisages the use of latent curing catalysts. Esters of aromatic mono- and/or polysulfonic acids and/or aromatic mono- or dicarboxylic acids are mentioned.

Salts or esters of acids, including boric acid, are also proposed in German Laid-Open Applications DOS No. 2,003,123, DOS No. 2,065,775 and DOS No. 2,142,449.

German Laid-Open Application DOS No. 2,805,936 describes the use of basic binder systems which contain some acidic groups. However, no acidic groups apart from carboxyl groups are mentioned.

Regarding the above prior art, it may be stated that the measures described to date do not permit optimum acid catalysis since, where a low molecular weight organic acid is used, for example p-toluenesulfonic acid, which would be suitable because it is expected to have a catalytic effect, only some of this acid is deposited on the substrate together with the coating agent, and the concentration of the acid in the elctrocoating bath increases and leads to problems during coating.

Although the method described in German Laid-Open Application DOS No. 2,250,042 attempts to overcome this problem, the measures taken here are technically very complicated and cannot be used for every cathodic electrocoating procedure.

The same applies to the use of sulfonates as to sulfonic acids, since it has been found that they are not sufficiently stable to hydrolysis.

Bearing in mind the above statements concerning the basicity of the coatings, carboxyl groups by their very nature have a poorer catalytic action.

It is an object of the present invention to overcome the above disadvantages of conventional systems and to provide cathodic electrocoating binders which permit more advantageous baking conditions, in particular in the presence of conventional curing agents, such as aminoplast and phenoplast resins.

We have found that this object is achieved by cathodic coating agents which are rendered water-dilutable by the addition of an acid, contain binders possessing basic nitrogen groups and may or may not contain pigments, dyes, fillers, solvents, antioxidants, other surface-coating assistants and/or additional crosslinking agents, wherein the binders contain sulfonate or phosphonate groups or both sulfonate and phosphonate groups, or the esters of these groups, in an amount of from 0.05 to 3% by weight, based on the total amount of the binders and crosslinking agents.

The binder can be either a mixture of a binder possessing basic nitrogen groups and a binder containing sulfonate and/or phosphonate groups, or a reaction product of a basic compound and a compound containing sulfonate and/or phosphonate groups, the basic nitrogen groups preferably being primary and/or secondary amino groups, as are obtained, for example, by reacting a resin carrying epoxide groups with a diamine or polyamine.

The present invention furthermore relates to processes for the preparation of the coating agents containing sulfonate and/or phosphonate groups, wherein, for example in the case of the sulfonate groups, a resin containing primary and/or secondary amino groups is reacted with an amidosulfonic acid which is unsubstituted or alkyl-substituted at the amido group, with elimination of ammonia or an alkylamine, or a sulfo-containing polyacrylate is added to a basic binder, or the sulfo-containing polyacrylate is reacted with a binder containing basic NH groups, aminolysis taking place.

The present invention further relates to a process for the cathodic electrocoating of electrically conductive substrates, wherein coating agents according to the invention are employed.

In conformity with their intended use according to the invention, the sulfonate and phosphonate groups are incorporated so that they cannot be eliminated from the polymeric compound, for example under the bath conditions employed or during ageing of the bath.

Over and above the excellent catalytic action of these groups, coating agents of this type, in spite of the fact that they contain Zwitter ions, surprisingly possess outstanding deposition properties even at high deposition voltages.

Compared with products which do not contain groups according to the invention, the coatings obtained are paler, excellent white and silver finishes resulting when crosslinking is carried out using aminoplast resins.

Regarding the components of the novel coating agents, the following may be stated specifically.

A large number of possible methods using various raw materials have been disclosed in the literature for the synthesis of macromolecules possessing basic nitrogen groups. Various possible syntheses are given below, the list essentially only being intended as an example.

For the purposes of the present invention, binders possessing basic nitrogen groups are polymeric or resin-like products containing primary, secondary, tertiary and quaternary nitrogen atoms, those possessing primary and/or secondary nitrogen atoms being preferred.

The most important group of starting materials for the preparation of polymeric substances possessing basic nitrogen atoms are epoxide-containing compounds, which are reacted with amines.

The best known epoxide-containing raw materials, whose common characteristic feature is the presence of an oxirane ring, are the glycidyl ethers of phenols, in particular of 4,4'-bis(hydroxyphenyl)propane. Other examples are the glycidyl ethers of phenol/formaldehyde condensates of the novolak type, glycidyl esters of aliphatic, aromatic or cycloaliphatic mono- or polycarboxylic acids, glycidyl ethers of aliphatic or cycloaliphatic diols or polyols, copolymers of glycidyl (meth)acrylate, or epoxidation products of aliphatic or cycloaliphatic olefins. This class of substances is described in detail in H. M. Paquin, Epoxide compounds and epoxy resins, Verlag Springer 1958.

Examples of amines which can be subjected to an addition reaction with oxirane rings are primary and secondary amines and their higher homologs or isomers, eg. dimethylamine, diethylamine, etc. Primary and secondary alkanolamines, for example dialkanolamine and diisopropanolamines, as well as aminoalkylalkanolamines are particularly suitable, while further examples are cyclic amines, such as ethyleneimine, morpholine and piperidine.

The compounds which lead to polymeric epoxide/amine adducts include, for example, ammonia (cf. German Laid-Open Applications DOS No. 2,914,297 and DOS No. 3,008,810) and in particular diamines, eg. ethylenediamine, propylene-1,3-diamine, hexamethylenediamine, 4,9-dioxododecane-1,12-diamine and diethylenetriamine (cf. German Laid-Open Application DOS No. 2,737,375).

Other diamines suitable for the reaction are primary/tertiary or secondary/secondary diamines (cf. German Laid-Open Application DOS No. 2,805,936). If the amines, particularly those possessing primary amino groups, are employed in excess, the oxirane-containing compound being metered in and the excess amine then being distilled off, epoxy resin derivatives containing primary and/or secondary amino groups are formed.

If the stated epoxy resin derivatives possess NH groups, they can furthermore be reacted with mono- and/or dicarboxylic acids or their esters, with a polyacrylate or with mono- and/or diepoxide compounds, after the basic groups have been introduced.

Another group of macromolecules containing basic nitrogen atoms is prepared by copolymerization of suitable basic monomers with hydroxyalkyl (meth)acrylates, preferably in the presence of further copolymerizable compounds. Basic monomers of this type belong to, for example, the group consisting of the (meth)acrylates and amides, such as N,N-dimethylaminoethyl (meth)acrylate and dialkylaminoalkyl (meth)acrylamide, where alkyl is of 1 to 10 carbon atoms. Examples of other suitable monomers possessing basic nitrogen atoms are vinylpyridine, N-vinylimidazole and N-vinylcarbazole. These compounds too, are present in the form of copolymers with hydroxyalkyl (meth)acrylates and, preferably, with further (meth)acrylates, (meth)acrylamides, vinylaromatics, such as styrene, vinyltoluene or -methylstyrene, or mixtures of these monomers.

A further group of macromolecules containing primary and secondary nitrogen atoms are the reaction products of diamines, eg. hexamethylenediamine, with epoxy resins and dicarboxylic acids or polyacrylates, as described in, for example, German Patent Applications Nos. P 34 22 472.6 (O.Z. 0050/37171) and P 34 22 473.4 (O.Z. 0050/37172).

Other suitable macromolecules possessing basic nitrogen atoms are substituted oxazolidines which are obtained by, for example, condensation of aminoalcohols, such as trishydroxymethylaminomethane or 2-amino-2-hydroxymethyl-1,3-propanediol with aliphatic carboxylic acids or carboxyl-containing macromolecules under conditions of cyclization (cf. for example German Laid-Open Application DOS No. 2,249,378).

A summary of this class of substances is given in Chem. Rev. 71 (5) (1971), 483–505.

Another group of macromolecules containing basic nitrogen atoms is obtained by the reaction of anhydride-containing substances with alkanolamines or the reaction of anhydride groups or their half esters with diamines which contain a primary and a tertiary nitrogen atom (cf. for example German Laid-Open Application DOS No. 2,805,936).

Introduction of the sulfonate or phosphonate groups into the basic binder systems can be carried out in different ways and depends on the synthesis and the composition of the coating agents.

It is possible to prepare novel coating agents by mixing sulfonate-containing or phosphonate-containing polymers, for example polyacrylates which contain copolymerizable sulfonic acid or phosphonic acid derivatives.

Such copolymerizable compounds are 2-acrylamido-2-methylpropanesulfonic acid, 2-acrylamido-2-decanesulfonic acid, vinylsulfonic acid, vinylphosphonic acid, 2-methylacrylamido-6-naphthalenesulfonic acid, sulfonated methylstyrene and the esters of these sulfonic acids and phosphonic acids, and mixtures of these compounds.

Polymers which contain sulfonate and phosphonate groups and may furthermore possess other functional groups can be reacted with binders which are already basic. For example, the abovementioned polyacrylates can be incorporated, via aminolysis, into NH-containing polymers, or substances of this type can be subjected to an aminolytic reaction with polyamines.

Another possible method of introducing sulfonate and phosphonate groups is a direct addition reaction of the abovementioned unsaturated compounds with polymers containing NH groups, for example with epoxide/diamine adducts as stated above, by a Michael-type addition reaction.

In another possible method, the hydroxymethanesulfonic acid is reacted with the NH-containing polymers, this reaction taking place with elimination of water.

Epoxide/amine adduct-$NH_2$ + HO—$CH_2$—$SO_3H$ → $H_2O$ + epoxide/amine adduct-NH—$CH_2$—$SO_3^{\ominus}$ + $H^{\oplus}$ A particularly preferred method of incorporation into basic binder systems is the reaction of amidosulfonic acids with NH-containing epoxide/amine adducts, for example

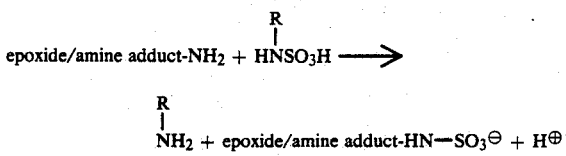

where R is H or $C_1$-$C_4$-alkyl.

For the preferred case in which the epoxide/amine adduct itself is used, the reaction takes place with elimination of ammonia at about 140°-180° C., and other reactions which take place in this temperature range, for example the reaction with mono- and dicarboxylic acids, may be carried out simultaneously with this reaction.

In order to ensure that the sulfonate groups have been completely incorporated into the binder, it is advantageous to ensure that complete conversion, ie. complete elimination of $NH_3$, takes place. The content of sulfonate and/or phosphonate groups is from 0.05 to 3.0, preferably from 0.1 to 2.0, particularly preferably from 0.2 to 1.5, % by weight, based on the total amount of biners and crosslinking agents in the coating agent.

If, when the coating agent is converted to the aqueous phase, the groups according to the invention are present as esters, they are virtually completely hydrolyzed to the corresponding sulfonate and phosphonate groups.

The amount of basic component is advantageously chosen so that the basicity of the coating agent after neutralization with an acid, eg. acetic acid, permits adeuate water-dilutability at pH 6-9, preferably 6.8-8.5.

In general, the binder systems have an amine number of from 20 to 150, preferably from 30 to 140, mg of KOH/g.

In order to crosslink the basic binders where these do not themselves possess a sufficient number of acid-catalyzable crosslinking groups, appropriate acid-catalyzable crosslinking agents are added.

Such crosslinking agents are preferably aminoplasts and phenoplasts.

Examples of suitable aminoplasts are the reaction products of ureas or melamines with aldehydes, some of which are further etherified with an alcohol. Specific examples of suitable starting materials for aminoplast resins are urea, ethyleneurea, thiourea, melamine, benzoguanamine, acetoguanamine and 2-oxo-4-hydroxyhexahydropyrimidine. Specific examples of aldehydes which can be used for the preparation of suitable aminoplast resins are formaldehyde, acetaldehyde and propionaldehyde, preferably formaldehyde. The aminoplast resins can be employed in the alkylol form, but are preferably used in the form of their ethers, the etherification agent being a monohydric alcohol of 1 to about 10, preferably 1 to 4, carbon atoms. Examples of suitable aminoplast resins are methylolurea, dimethoxymethylolurea, butylated polymeric urea/formaldehyde resins, hexamethoxymethylmelamine, methylated polymeric melamine/formaldehyde resins and butylated polymeric melamine/formaldehyde resins. For example, highly etherified products having a low methylol content are particularly suitable. Aminoplast resins and methods for their preparation are described in, for example, Encyclopedia of Polymer Science and Technology, Volume 2 (1965), pages 1-91, Interscience Publishers.

Phenoplast resins are the reaction products of phenols with aldehydes which possess reactive methylol groups. The resins can be monomeric or polymeric, depending on the phenol/aldehyde molar ratio used in the first condensation. Specific examples of phenols which can be used for the preparation of the phenoplast resins are phenol, o-, m- or p-cresol, 2,4-xylenol, 3,4-xylenol, 2,5-xylenol, Cardanol and p-tert.-butylphenol, bisphenols, such as bisphenol A, and novolaks. Aldehydes which can be used for this reaction are formaldehyde, acetaldehyde and propionaldehyde, preferably formaldehyde. Particularly useful phenoplast resins are polymethylolphenols in which the phenol group is etherified with an alkyl radical (eg. methyl or ethyl). Preferably used products are those which possess alkyl ether groups or those whose methylol groups have been partially or completely etherified with $C_1$-$C_{10}$-alcohols. Phenoplast resins and methods for their preparation are described in, for example, Encyclopedia of Polymer Science and Technology, Volume 10 (1969), pages 1-68, Interscience Publishers.

The amount of aminoplast and/or phenoplast resins to be used for the novel binder system can be as high as 45% by weight, based on the total weight of solids in the binder system (binder possessing basic nitrogen groups+crosslinking agent).

Other crosslinking agents whose curing characteristics can be influenced by acid catalysis are polyfunctional esters; such products are mentioned in European Pat. Nos. 4,090, 12,463, 40,867, 25,554 and 25,555.

If necessary, the crosslinking agents, too, may contain sulfonate or phosphonate groups. For example, compounds which contain not only sulfonic acid and phosphonic acid groups or their esters but also other reactive groups suitable for cocondensation (basic or amidic NH groups) can be concomitantly used in the preparation of phenoplasts or incorporated subsequently. If crosslinking agents possessing basic groups are employed, the amount of these should be at least sufficient to ensure the formation and neutralization of sulfonate or phosphonate groups.

The preparation of the novel coating agents is carried out either by mixing the components at temperatures at which satisfactory homogenization is ensured, or by partial reaction between the components at up to 150° C., preferably from 70° to 120° C. The mixing and the reaction are advantageously carried out in a solvent, eg. an alcohol, a glycol ether, a ketone or a mixture of these.

In order to render the novel coating agents water-dilutable, the basic nitrogen atoms of the binder systems of the invention are partially or completely neutralized with organic and/or inorganic acids, preferably formic acid, acetic acid or lactic acid. The degree of neutralization in the individual case depends on the particular binder system. In general, the acid is added in an amount such that the coating agent in the processing form can be diluted with water or dispersed therein, at pH 6-9, preferably 6.8-8.5.

The concentration of the binder in water is from 5 to 25, preferably from 10 to 20, % by weight. The formulation of the novel coating agent which is employed at the processing stage can contain, in addition to the binder system and any crosslinking components employed, various conventional additives, such as pigments, dyes, fillers, solvents, antioxidants and/or other surface coating assistants.

The novel coating agents are particularly useful for the cathodic electrocoating of metal articles.

In the deposition procedure, an aqueous coating agent bath containing the novel binder is brought into contact with an electrically conductive anode and an electrically conductive cathode, and the surface of the cathode is coated with the coating agent. Various electrically conductive substrates may be coated, in particular metallic substrates, such as steel, aluminum, copper and the like, but also metallized plastics or other substances provided with a conductive coating, in particular phosphatized steel sheets.

After the deposition procedure, the coating is, if required, washed with water, and is cured at elevated temperatures of from 130° to 200° C., preferably from 150° to 190° C., for from 5 to 30, preferably from 10 to 25, minutes. The resulting coatings possess excellent properties. Surprisingly, pale coatings can be obtained using the novel biners, particularly in combination with melamine resins as crosslinking agents. Surprisingly, the presence of incorporated sulfonate or phosphonate groups does not have an adverse effect on the corrosion properties.

In the Examples which follow, parts and percentages are by weight, unless stated otherwise.

EXAMPLES

Preparation of the epoxide/amine adducts (A) 2099.0 parts of a diglycidyl ether obtained from epichlorohydrin and bisphenol A and having an epoxide value of 0.5 and 524.2 parts of a resin of this type having an epoxide value of 0.2 are dissolved in 1124.0 parts of toluene at 70° C.

3481 parts of this solution are metered into 682.0 parts of ethylenediamine at 70° C. in the course of 2.5 hours.

When the addition is complete, the excess amine is substantially removed by distillation under reduced pressure, at 190° C. in the final stage. The product has an amine number of 210 mg of KOH/g.

(B) 1614.6 parts of a diglycidyl ether obtained from epichlorohydrin and bisphenol A and having an epoxide value of 0.5 and 403.0 parts of a resin of this type having an epoxide value of 0.2 are dissolved in 864.5 parts of toluene at 70° C.

2678.0 parts of this solution are metered into 869.2 parts of hexamethylenediamine at 70° C. in the course of 2.5 hours. Some of the excess amine is removed at 150° C. under reduced pressure, and the concentrate is further processed in a thin film evaporator at 190° C. and under 0.3 mm Hg.

The product has a softening point of 70° C. and a total nitrogen content of 4.7%, 1.9% being attributable to primary amino groups, 2.6% to secondary amino groups and 0.2% to tertiary amino groups.

Preparation of binders according to the invention (A1) 400.0 parts of the adduct described under (A) are heated to 170° C. with 90.0 parts of a dimeric fatty acid (Pripol 1014®), 7.0 parts of triphenylphosphine and 80.0 parts of isodecanol, and the mixture is kept at this temperature, with removal of the water of reaction, until the acid number reaches 4 mg of KOH/g. The mixture is then diluted with a mixture of 66.5 parts of butylglycol, 66.5 parts of ethylene glycol, 66.5 parts of toluene and 45 parts of ethanol. The solids content of the binder solution is 61%.

6×82 parts of this binder solution are mixed with 16.6 parts, based on solid resin, of benzoguanamine/formaldehyde resin which is etherified with methanol and ethanol and has a solids content of 98% (eg. ®Cymel 1123 from Cyanamid Inc.). The sample O remains untreated (=comparative sample). Increasing amounts of an aqueous hydroxymethanesulfonic acid solution described below are added to samples I-IV (cf. Table 1).

The thoroughly mixed resin samples O-IV are cast to give uniformly thin sheets and are dried under greatly reduced pressure (about 1 mbar) at room temperature. Test samples are then punched out and are measured in an oscillation viscometer with parallel sheets at 160° C. and 180° C. FIG. 1 (160° C.) and FIG. 2 (180° C.) show the oscillation amplitude A transmitted by the sample as a function of the curing time t. The increase in A means an increase in the viscosity or the shear modulus of the sample, ie. increasing crosslinking. Table 1 shows the times taken for A to reach $10^2$.

TABLE 1

| Sample | Hydroxymethanesulfonic acid | | t for A = $10^2$ [min ] | |
|---|---|---|---|---|
| | aqueous solution [ml] | calculated as acid [%], based on solid resin | 160° C. | 180° C. |
| 0 | — | — | 10.3 | 2.9 |
| I | 4.00 | 0.85 | 8.3 | 2.3 |
| II | 5.90 | 1.26 | 7.4 | 1.4 |
| IIa | 5.90 | 1.26 | 6.5 | 1.2 |
| III | 7.95 | 1.69 | 4.0 | 1.5 |
| IV | 11.85 | 2.53 | 0.9 | 1.1 |

Preparation of a hydroxymethanesulfonic acid solution ($HO-CH_2SO_3H$)

300.0 parts of an aqueous 40% strength formaldehyde solution in 1233 parts of water are gassed with 263.0 parts of $SO_2$ at from 50° to 55° C. in the course of 45 minutes, while stirring and cooling. The aqueous solution is mixed with the resin mixtures according to Example A1.

(B1) 55.0 parts of a dimeric fatty acid (Pripol 1014®), 20 parts of stearic acid, 7 parts of triphenylphosphine, 80.0 parts of isodecanol and 25 parts of toluene are added to 400.0 parts of the adduct described under (B), and the mixture is heated to 100° C. 2.15 parts of amidosulfonic acid, dissolved in 5 parts of warm $H_2O$, are then added, and the mixture is heated to 160° C. in the course of 1.5 hours, toluene, the water added, some of the water of reaction and, above 140° C., ammonia being removed. The mixture is kept at 170° C. until the melt viscosity has reached 1650 mPa.s, measured at 150° C. using an Epprecht viscometer. The acid number is 6.3. The mixture is diluted with a mixture of 66.5 parts of butylglycol, 66.5 parts of ethylglycol, 66.5 parts of toluene and 41.5 parts of ethanol.

The solids content is 60.5%, the amine number is 73 mg of KOH/g and the tert.-amine number is 4.5 mg of KOH/g.

To carry out electrocoating, 466 parts of the binder are mixed with 128.0 parts of melamine resin (Cymel 325 from Cyanamid) and 46.0 parts of the melamine resin Cymel 1116, 20 parts of isodecanol and 8.4 parts of acetic acid, and the mixture is diluted with fully demineralized water to give a bath having a volume of 4000 parts and a solids content of 10%. The bath is stirred for 24 hours, at 23° C., and has a pH of 7.8 and a conductivity of 1200 [μS]. Deposition at 300 V for 2 minutes onto zinc phosphate-coated steel sheets connected as the cathode, and baking for 30 minutes at 160° C., give virtually colorless coatings about 18 um thick which possess excellent resilience and corrosion properties.

The throwing power (Ford method) is 18 cm. The corrosion test according to DIN 50,021 gives a value of 3 mm after 20 days.

We claim:

1. A cathodic coating agent which is rendered water-dilutable by the addition of acids, said coating agent including a binder having basic nitrogen groups, said binder containing sulfonate or phosphonate groups, the esters of these groups or mixtures of these groups, which sulfonate or phosphonate groups cannot be eliminated from the binder compound under the coating bath conditions, in an amount of from 0.05 to 3% by weight based on the total amount of the binders and crosslinking agents.

2. The coating agent of claim 1, which contains, as the binder, a mixture of a binder possessing basic nitrogen groups and a binder possessing sulfonate or phosphonate groups or both sulfonate and phosphonate groups.

3. The coating agent of claim 1, which contains, as the binder, a reaction product of a basic compound with a compound possessing sulfonate or phosphonate groups or both sulfonate and phosphonate groups.

4. The coating agent of claim 1, which contains, as basic nitrogen groups, primary or secondary, or primary and secondary, amino groups.

5. A cathodic coating agent as defined in claim 1, which further contains one or more pigments, dyes, fillers, solvents, antioxidants, other surface coating assistants and additional crosslinking agents.

6. An aqueous coating agent bath for cathodic electrocoating containing crosslinking components, a binder having basic nitrogen atoms which are partially or completely neutralized, said binder containing sulfonate or phosphonate groups, the esters of these groups or mixtures of these groups, which groups cannot be eliminated from the binder compound by hydrolysis, in an amount of from 0.05 to 3% by weight based on the total amount of the binder and crosslinking agents.

7. A process for the preparation of a sulfonate-containing coating agent as defined in claim 1, wherein, for the preparation of the binder, a resin containing primary or secondary, or primary and secondary, amino groups is reacted with an unsubstituted or alkyl-substituted amidosulfonic acid, with elimination of ammonia or an alkylamine.

8. The process of claim 7, wherein the resin containing primary or secondary, primary and secondary, amino groups is a reaction product of an epoxide-containing resin with a di- or polyamine.

9. A process for the preparation of a sulfonate-containing coating agent as defined in claim 1, wherein a sulfo-containing polyacrylate is added to a basic binder.

10. A process for the preparation of the sulfonate-containing coating agent as defined in claim 2, wherein a sulfo-containing polyacrylate is added to a basic binder.

11. The process of claim 9, wherein the sulfo-containing polyacrylate is reacted with a binder containing basic NH groups, aminolysis taking place.

* * * * *